US 8,747,803 B1

(12) United States Patent  (10) Patent No.: US 8,747,803 B1
Horne  (45) Date of Patent: Jun. 10, 2014

(54) PROCESS FOR MANUFACTURING OF LESS ACIDIC FERROUS SULFATE

(71) Applicant: Ronald L. Horne, San Felipe, TX (US)

(72) Inventor: Ronald L. Horne, San Felipe, TX (US)

( * ) Notice: Subject to any disclaimer, the term of this patent is extended or adjusted under 35 U.S.C. 154(b) by 0 days.

(21) Appl. No.: 13/856,502

(22) Filed: Apr. 4, 2013

Related U.S. Application Data

(60) Provisional application No. 61/620,147, filed on Apr. 4, 2012.

(51) Int. Cl.
*C01G 49/14* (2006.01)
(52) U.S. Cl.
USPC .......................................................... 423/558
(58) Field of Classification Search
USPC .......................................................... 423/558
See application file for complete search history.

(56) References Cited

U.S. PATENT DOCUMENTS 4,814,158 A * 3/1989 Everill ........................ 423/558

* cited by examiner

*Primary Examiner* — Timothy Vanoy
(74) *Attorney, Agent, or Firm* — Egbert Law Offices, PLLC

(57) ABSTRACT

A process of producing a less acidic ferrous sulfate includes the steps of placing iron shavings within a tank, introducing sulfuric acid and water into the tank, retaining the sulfuric acid and water and the iron shavings within the tank for a period of time so as to react the sulfuric acid and water and iron shavings in order to produce less acidic ferrous sulfate, and removing the less acidic ferrous sulfate from the tank. The iron shavings and the sulfuric acid and the water are reacted together in the tank for a period of time of between twelve and twenty-four hours. The less acidic ferrous sulfate is $Fe(SO_4)_{<1.0}$.

20 Claims, 1 Drawing Sheet

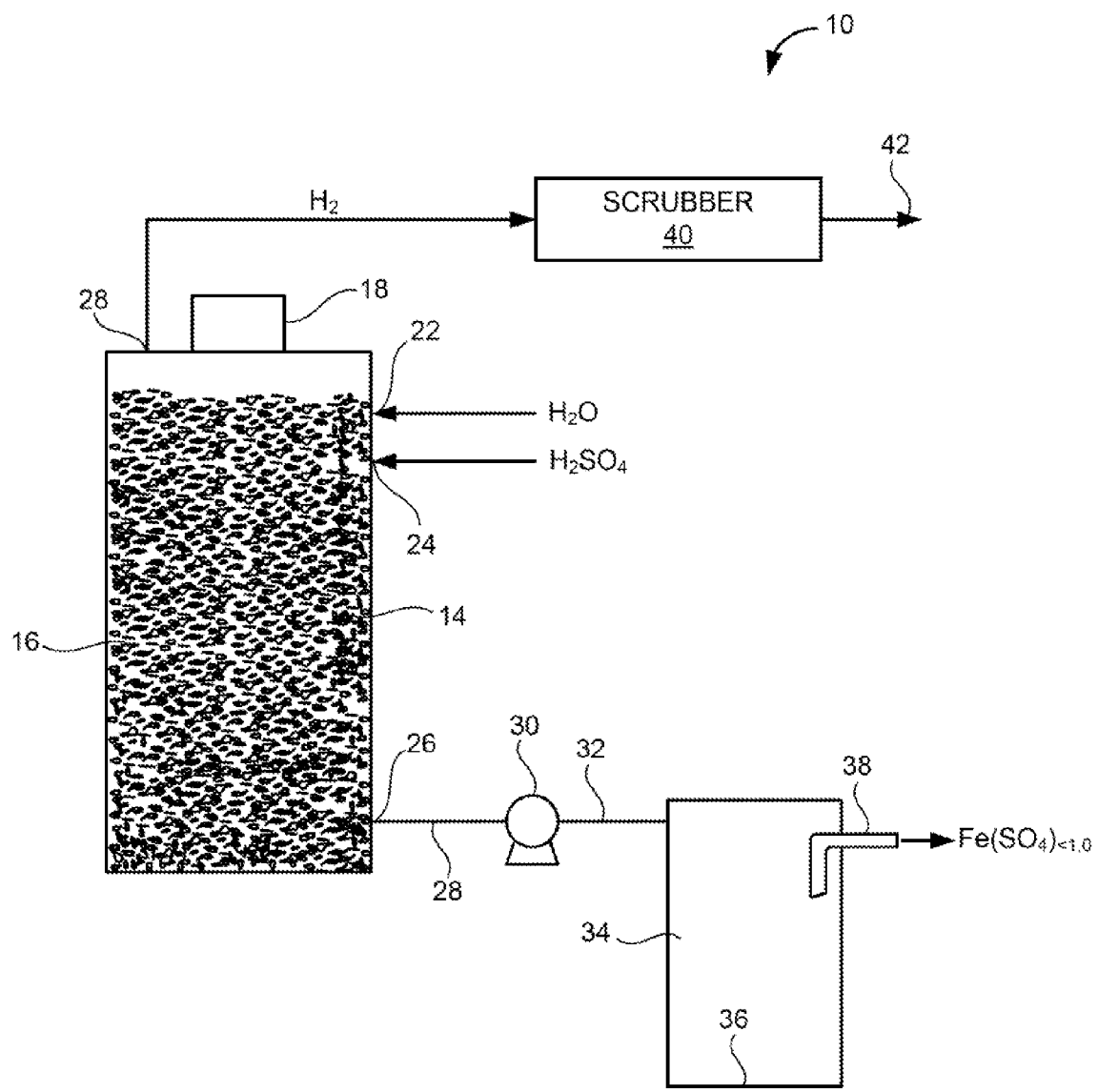

US 8,747,803 B1

PROCESS FOR MANUFACTURING OF LESS ACIDIC FERROUS SULFATE

RELATED U.S. APPLICATIONS

The present application claims priority from U.S. Provisional Patent Application Ser. No. 61/620, 147, filed on Apr. 4, 2012, and entitled "Process for Manufacturing of Less Acidic Ferrous Sulfate".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to process for the production of ferrous sulfate. Additionally, the present invention relates to the production of ferrous sulfate having a pH of greater than 2. Additionally, the present invention relates to the production of less acidic pH ferrous sulfate.

2. Description of Related Art Including Information Disclosed Under 37 CFR 1.97 and 37 CFR 1.98.

Ferrous sulfate is the chemical compound with a formula ($FeSO_4$). Industrially, ferrous sulfate is mainly used as a precursor to other iron compounds. It can be employed as a reducing agent, such as for the reduction of chromate in cement. Ferrous sulfate has been employed extensively for the purification of water by flocculation and phosphate removal in municipal and industrial sewage treatment plants in order to prevent eutrophication of surface water bodies. Ferrous sulfate is also used as colorants, nutritional supplements, for wood treatment, and odor and corrosion control.

Conventionally, ferrous sulfate will have a pH of 2. As such, ferrous sulfate is highly acidic. The acidity of such ferrous sulfate is so great as to be treated as a hazardous substance by regulatory authorities. Whenever a chemical is considered, a "hazard substance", the costs of use and handling increase substantially. A great deal of care must be employed whenever such a hazardous substance is stored. As such, certain municipal waste water authorities desire that such ferrous sulfate be less acidic so as to be treated as a non-hazardous substance. Ideally, ferrous sulfate having a pH of 4 is considered desirable. The ferrous sulfate, at this high pH, would be able to carry out the necessary chemical reactions within the waste water while, at the same time, be treated at a non-hazardous substance.

Conventionally, one would presume that the addition of water to such ferrous sulfate would be effective in reducing the acidity of such ferrous sulfate. Unfortunately, water addition to ferrous sulfate will only dilute the acid but will not raise the pH. As such, water addition is not effective in raising the pH1 of the ferrous sulfate.

It is an object of the present invention to provide a process for the manufacturing of ferrous sulfate that reduces the acidity of the ferrous sulfate.

It is another object of the present invention to provide a process of the manufacturing of ferrous sulfate which maintains the integrity of the ferrous sulfate formula.

It is still another object of the present invention to provide a process of the manufacturing of less acidic ferrous sulfate which is easy to implement, easy to use and relatively inexpensive.

These and other objects and advantages of the present invention will become apparent from a reading of the attached specification and appended claims.

BRIEF SUMMARY OF THE INVENTION

The present invention is a process for producing less acidic ferrous sulfate. This process includes the steps of: (1) forming a tank having fine iron shavings or other iron sources therein: (2) introducing sulfuric acid and water into the tank; (3) retaining the sulfuric acid and water with the iron shavings or other iron sources for an extended period of time; and (4) removing the less acidic ferrous sulfate from the tank.

In the process of the present invention, water can be introduced into the vessel along with sulfuric acid. The water and the sulfuric acid are reacted with the iron during the step of retaining. Typically, the ferrous sulfate, the water and the sulfuric acid are retained within the tank for a period of time of between twelve to twenty-four hours. The ferrous sulfate and any excess sulfuric acid are reacted with the iron during this retention period.

After the retention period, the reacted ferrous sulfate is then passed to a settling tank where it is filtered or purified. As such, line particles can be separated from the ferrous sulfate solution. A less acidic ferrous sulfate solution can be discharged. The less acidic ferrous sulfate solution can be recycled back to reduce the retention time of the step of retaining.

Since hydrogen is the byproduct of the process of reacting, the hydrogen can be passed outwardly of the tank. This hydrogen can be delivered to a scrubber and then passed to the atmosphere.

A pump can be employed so as to move the less acidic ferrous sulfate from the tank to the settling tank and/or to recirculate the less acid ferrous sulfate back to the tank. This pump has one end connected to a bottom of the reactor tank and an outlet connected to the settling tank. As such, the ferrous sulfate can be delivered to the settling tank at an upper end thereof. After the small particles settle from the solution, the less acidic ferrous sulfate solution can be passed outwardly of the settling tank.

Fundamentally, the process of the present invention tends to create a poly-ferrous sulfate because not enough acid is used to make the ferrous sulfate molecule.

The foregoing Section is intended to describe, in generality, the preferred embodiment of the present invention. It is understood that modifications to this preferred embodiment can be made within the scope of the present invention. As such, this Section should not to be construed, in any way, as limiting, of the scope of the present invention. The present invention should only be limited by the following claims and their legal equivalents.

BRIEF DESCRIPTION OF THE SEVERAL. VIEWS OF THE DRAWING

FIG. 1 is a diagrammatic illustration of the process for the production of a less acidic ferrous sulfate in accordance with the teachings of the present invention.

DETAILED DESCRIPTION OF THE INVENTION

Referring to FIG. 1, there is shown the process 10 for the production of a less acidic ferrous sulfate. It can also be used to make a less acid ferrous chloride solution. In the process shown in FIG. 1, there is tank 12 containing a supply of finely divided iron shavings 14. The iron shavings 14 substantially fill the interior volume 16 of the tank 12. The tank 12 is sealed so as to have an access port 18 at a top thereof. The tank 12 also has a water inlet 22 and a sulfuric acid 24 inlet adjacent an upper portion thereof. An outlet 26 is generally positioned at the bottom of the tank 12. Additionally, the tank 12 has a hydrogen outlet 28 located at the upper end thereof.

In the present invention, the fine iron shavings can be easily obtained from many sources. These fine iron shavings are readily available commercially and relatively inexpensive. The present invention utilizes iron shavings so as to achieve the benefits of the present invention. The fine iron shavings 14 may be introduced into the interior volume 16 of the tank 12 through the access port 18. Other access ports can be applied to the tank 12 as required. Water is introduced through the water inlet 22 and sulfuric acid is introduced to the sulfuric acid inlet 24. As such, the interior volume 16 of the tank 12 will have an intimate mixture of the water and the sulfuric acid, along with the iron shavings 14.

In the process of the present invention, this solution will reside within the interior volume 16 of the tank 12 for a period of twelve to twenty-four hours. As such, the reaction of these various components can be carried out completely and fully within the interior volume 16. Of course, this process can be speeded up or slowed down depending on the temperature of the reaction. One would expect that the reaction of the sulfuric acid and the iron to be in accordance with the following formula:

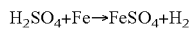

$$H_2SO_4 + Fe \rightarrow FeSO_4 + H_2$$

Unfortunately, this process produces hydrogen and also produces ferrous sulfate having a pH of between 1 and 2. As a result, this is highly acidic. Fortunately, in the process of the present invention, it has been found, through experimentation, that the resulting product has a pH of greater than 4 and, in particular, a pH1 of 5.5.

In FIG. 1, the reacted solution is then passed from the tank 12 through line 28 to a pump 30. Pump 30 serves to deliver the solution through a line 32 to a settling tank 34. When the solution is in the settling tank 34, the particles will descend toward the bottom 36 of the settling tank. As such, an outlet 38 can be utilized so as to deliver the ferrous sulfate outwardly of the settling tank.

The hydrogen byproduct of the process 10 of the present invention will pass outwardly of the tank 12 through the hydrogen outlet 28. The hydrogen is then delivered to a scrubber 40 and outwardly to the atmosphere 42.

Experimentation with the process of the present invention has suggested that the ferrous sulfate molecule is actually changed. As such, instead of the original composition of $Fe(SO_4)_1$, the formula becomes $Fe(SO_4)_{<1.0}$. It is believed that the formula would be $Fe(SO_4)_{0.95}$. This small change of the molecule has been found to increase the pH to greater than 4. As such, the resulting ferrous sulfate is no longer classified as a hazardous substance.

The foregoing disclosure and description of the invention is illustrative and explanatory thereof. Various changes in the details of the described process can be made without departing from the true spirit of the present invention. The present invention should only be limited by the following claims and their legal equivalents.

I claim:

1. A process for producing a less acidic ferrous sulfate, the process comprising:
   placing iron material within a tank;
   introducing sulfuric acid and water into said tank;
   retaining the sulfuric acid and water and the iron material within the tank for a period of time so as to react the sulfuric acid and water and iron material so as to produce less acidic ferrous sulfate; and
   removing the less acidic ferrous sulfate from said tank.

2. The process of claim 1, said iron material being fine iron shavings.

3. The process of claim 1, the step of introducing the sulfuric acid and water comprising:
   flowing a mixture of the water and the sulfuric acid into an interior volume of said tank.

4. The process of claim 1, the step of reacting comprising:
   reacting the iron material and the sulfuric acid and the water together in said tank for a period of time of between twelve and twenty-four hours.

5. The process of claim 1, the step of removing comprising:
   passing the reacted less acidic ferrous sulfate to a settling pond.

6. The process of claim 5, further comprising:
   filtering fine particles from the passed reacted less acidic ferrous sulfate.

7. The process of claim 1, further comprising:
   recycling a portion of the removed less acidic ferrous sulfate back to an interior of said tank.

8. The process of claim 1, further comprising:
   passing hydrogen outwardly of said tank following or during the step of retaining.

9. The process of claim 1, the step of removing comprising:
   pumping the less acidic ferrous sulfate from said tank; and
   passing the pumped less acidic ferrous sulfate to a settling vessel.

10. The process of claim 9, further comprising:
    attaching a pump so as to have an inlet at a bottom of said tank and an outlet at an upper end of said settling vessel.

11. The process of claim 9, further comprising:
    settling particles of the less acidic ferrous sulfate to a bottom of said settling tank; and
    passing the less acidic ferrous sulfate outwardly of said settling tank.

12. The process of claim 1, said less acidic ferrous sulfate being $Fe(SO_4)_{<1.0}$.

13. A process for producing a less acidic ferrous sulfate, the process comprising:
    placing iron shavings into a tank;
    introducing sulfuric acid and water into said tank;
    retaining the sulfuric acid and water and the iron shavings within the tank for a period of time so as to react the sulfuric acid and water and iron shavings within the tank in order to produce less acidic ferrous sulfate; and
    removing the less acidic ferrous sulfate from said tank.

14. The process of claim 13, the step of reacting comprising:
    reacting the iron shavings and the sulfuric acid and the water together in said tank for a period of time of between twelve and twenty-four hours.

15. The process of claim 13, further comprising:
    recycling a portion of the removed less acidic ferrous sulfate back to an interior of said tank.

16. The process of claim 13, further comprising:
    passing hydrogen outwardly of said tank following or during the step of retaining.

17. The process of claim 13, the step of introducing the sulfuric acid and water comprising:
    flowing a mixture of the water and the sulfuric acid into an interior volume of said tank.

18. The process of claim 13, the step of removing comprising:
- pumping the less acidic ferrous sulfate from said tank; and
- passing the pumped less acidic ferrous sulfate to a settling vessel.

19. The process of claim 18, further comprising:
- attaching a pump so as to have an inlet at a bottom of said tank and an outlet at an upper end of said settling vessel;
- settling particles of the less acidic ferrous sulfate to a bottom of said settling tank; and
- passing the less acidic ferrous sulfate outwardly of said settling tank.

20. The process of claim 13, said less acidic ferrous sulfate being $Fe(SO_4)_{<1.0}$.

* * * * *